United States Patent Office 3,200,149
Patented Aug. 10, 1965

3,200,149
α-6-DEOXYTETRACYCLINE DERIVATIVES
AND PROCESS
Robert K. Blackwood, Gales Ferry, Hans H. Rennhard, Lyme, John J. Beereboom, Waterford, and Charles R. Stephens, Jr., Niantic, Conn., assignors to Chas. Pfizer & Co., Inc., New York, N.Y., a corporation of Delaware
No Drawing. Filed May 5, 1961, Ser. No. 108,146
21 Claims. (Cl. 260—559)

This application is a continuation-in-part of previously copending application Serial No. 31,236 as filed May 23, 1960, and now abandoned.

The present invention relates to new and useful tetracyclines and the process for producing the same. More particularly, the present invention relates to 6-epi-6-deoxytetracyclines, D-ring substituted analogs thereof, 11a-substituted analogs thereof, and D-ring-11a-substituted analogs thereof, as well as the method of producing these compounds.

In accordance with the present invention, it has been found that hydrogenation of 6 - deoxy - 6 - demethyl-6-methylenetetracyclines, including various D-ring substituted and 11a-substituted analogs thereof, is an exceedingly valuable method for producing known 6-deoxytetracyclines and, in addition, also produces a class of new and useful derivatives having chemical, physical and biological properties distinct from these known 6-deoxytetracyclines by virtue of an altered stereochemical configuration. These new tetracyclines possess a definite microbiological activity against a variety of Gram-positive and Gram-negative microorganisms and are appropriately designated as 6-epi-6-deoxytetracyclines since the steric configuration of the 6-methyl group is opposite to that of the known 6-deoxytetracyclines. By "known 6-deoxytetracyclines" is meant the prior art products obtained by the catalytic hydrogenation of fermentation produced tetracyclines. Thus the nomenclature "6-epi" as employed herein, is completely analogous to the accepted nomenclature for naming the known 4-epitetracyclines in that it refers to a steric configuration which is opposite to that of the previously known isomer.

The new tetracyclines of the present invention are preferably designated as α-6-deoxytetracyclines since such nomenclature has found acceptance in the scientific literature. Under this system, 6-deoxytetracyclines, i.e., the known prior art isomers, are designated as "β-6-deoxytetracyclines." Accordingly, it will be understood that "6-epi" and "α" are used interchangeably hereinafter to refer to the identical compound.

In accordance with the process of the present invention, an appropriate tetracycline compound as defined hereinafter, is dissolved or suspended in the amphoteric form, or as an acid addition salt or polyvalent metal salt complex thereof in a reaction inert solvent medium in the presence of a catalytic amount of a noble metal catalyst and contacted with hydrogen at an appropriate temperature and pressure until reduction of the 6-methylene group occurs. Thereafter, a mixed 6-epi-6-deoxytetracycline and 6-deoxytetracycline may be recovered by conventional procedure involving catalyst removal and recovery from the solvent medium. This mixture then may be in turn subjected to chromatographic procedure or other procedures to separate such mixture into its components.

As used herein "reaction inert solvent medium" refers to any media which is a solvent or suitable suspending agent for the antibiotic reactant, is stable under the hydrogenation conditions and does not interfere with the effectiveness of the catalyst or interact with the antibiotic. Polar organic solvents are generally suitable and include the lower alkanols such as methanol, ethanol, and butanol, etc., cyclic and straight chain water soluble ethers such as dioxane, tetrahydrofuran, diethylene glycol monomethylether, 2-ethoxyethanol, the lower alkanoic acids such as acetic acid, propionic acid, aqueous media including the foregoing solvents, dilute aqueous hydrochloric acid, etc. As will be appreciated these solvents and others are conventional in known hydrogenation techniques applicable to the tetracycline antibiotics and hence are not critical. Preferred results are obtained, however, if acidic media, as opposed to basic media, are employed since the latter may tend to promote decomposition and hence reduce the yield of the desired product. Preferred solvent usage is illustrated in the working examples appearing hereinafter.

The temperature is no more critical in the present process than it is in other known hydrogenations of the tetracycline antibiotics. Thus, the preferred temperature range is from about 0 to about 60° C., the preferred temperature within this range being from about 10–50° C. and preferably room temperature. At temperatures below 0° C. the reaction is inordinately slow whereas at temperatures above about 60° C., decomposition of the starting material may occur. As is to be expected, the higher the temperature, the faster the reaction rate.

The noble metal catalysts as employed in the present invention include platinum, palladium, rhenium, rhodium and ruthenium, either of the supported or non-supported type, as well as the known catalytic compounds thereof such as the oxides, chlorides, etc. Examples of suitable catalyst supports include carbon, silica and barium sulfate. The catalysts may be preformed or formed in situ by prereduction of an appropriate salt of the catalytic compound. Examples of preferred catalysts are 5% palladium-on-carbon, 5% platinum-on-carbon, 5% rhodium-on-carbon, platinum chloride, palladium chloride, platinum oxide and ruthenium oxide. Materials such as the latter, where the metal is in a combined, non-elemental form, generally require prereduction before the hydrogenation can take place. This is accomplished simply by suspending the catalyst precursor in the hydrogenation medium, hydrogenating it, adding the substrate and continuing the hydrogenation. Alternatively, all of the components can be incorporated at once and hydrogenation commenced. The former procedure has the advantage of permitting the operator to separately determine the quantity of hydrogen absorbed during the catalyst prereduction and hydrogenolysis phase. The extent of hydrogenation of the antibiotic can then be more readily controlled.

The expression "catalytic amount" as used herein is well understood by those skilled in the art of known tetracycline hydrogenation, i.e., it is the same amount as illustrated in the examples appearing herein.

Rhodium is the preferred catalyst for the process of the present invention since it produces the highest overall yield of 6-epi-6-deoxy- and 6-deoxytetracyclines. Additionally, use rhodium permits retention of a 7-halo substituent where the starting compound is for example, 7-halo-6-deoxy-6-demethyl-6-methylene-5 - oxytetracyline. Where retention of such 7-halo substituent is not desired, palladium is found to be a preferred catalyst. However, the other noble metal catalysts are entirely operative to obtain both 6-epi-6-deoxy- and 6-deoxytetracyclines.

The pressure employed during hydrogenation is not critical and is primarily dependent upon apparatus availability. In general, pressures of from atmospheric to 2,000 p.s.i. are preferred. As is known, hydrogenation at atmospheric pressure is generally carried out in equipment wherein a measured volume of hydrogen contained in a reservoir is attached to a manometer in order to measure the volume of hydrogen consumed. Alternatively, a citrate of magnesia bottle and mechanical shaker with a calibrated pressure gauge, or a high pressure autoclave of the stirred or shaken variety may be employed.

For the purpose of the process of the present invention, suitable starting compounds include those represented by the following formulae:

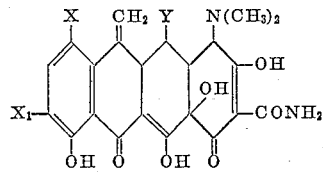

and

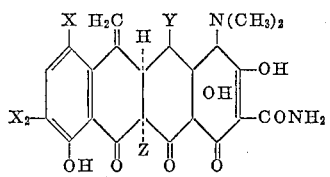

wherein Y may be hydrogen or hydroxyl, X may be hydrogen, chloro, iodo or bromo, $X_1$ may be hydrogen, amino, and lower alkanoylamino, $X_2$ may be hydrogen or nitro and Z is chloro or fluoro. Additionally, the acid addition salts and the polyvalent metal salt complexes of these compounds may be employed. It will be noted that the steric configuration at the 5a and 11a positions is indicated in the second formula above.

Since the above described starting compounds for the process of the present invention are relatively new but known tetracycline compounds, examples illustrating preparation thereof including necessary starting materials appear hereinafter as Examples I–XXXI. In general, the method of preparation involves treatment of an 11a-halo 6,12-hemiketal of an appropriate tetracycline compound with a strong acid of the dehydrating type such as sulfuric, trifluoroacetic, polyphosphoric, perchloric, hydrogen fluoride and the like. Of these the preferred is hydrogen fluoride. Optimum conditions are readily determined by routine experimentation. Generally, the selected 11a-halo hemiketal is merely added to the selected acid and allowed to react, most appropriately at a temperature within the range of from 0 to 50° C. and for a time of up to several hours. After reaction is complete the product is recovered in an appropriate manner, e.g. in the case of volatile acids by evaporation of the same to obtain the residual product, and in other cases by standard procedure such as stirring with a non-solvent (e.g. diethyl ether) to precipitate the product. These 6-methylene compounds may be converted to salts such as the hydrochloride by standard procedure prior to hydrogenation.

Substituent variation in the starting materials for the process of the present invention is also well illustrated in the referred to working examples. In brief, 7-halogenation of the starting material may be obtained by direct halogenation of an 11a-halo-6-deoxy-6-demethyl-6-methylene-5-oxytetracycline employing such well known reagents as N-chloro-, N-bromo-, and N-iodosuccinimide. For this purpose, liquid hydrogen fluoride has been found to be a preferred reaction medium and temperatures ranging from as low as −40° C. up to about 60° C. are entirely suitable. The resulting 7,11a-dihalo compound may be used as such or may be converted to the corresponding 11a-deshalo compound by the procedures such as illustrated in Example VI hereof.

Direct nitration of the selected 6-deoxy-6-demethyl-6-methylenetetracycline serves as a convenient method for producing the 9-nitro starting materials of the present invention. In this method, the starting compound is reacted with nitric acid per se or formed in situ, e.g., potassium nitrate and sulfuric acid. For best results, nitration is carried out in a solvent such as liquid hydrogen fluoride, a lower alkanoic acid, etc. When hydrogen fluoride is used as solvent it also acts as proton donor to form nitric acid in situ with nitrate salts. The use of high temperatures in excess of 50° C. should be avoided, preferred results being obtained at room temperature and even lower when liquid hydrogen fluoride is employed as solvent. Reaction times may vary as much as from 15 minutes to 12 hours.

When the desired starting compound is an 11a-deshalo-6-deoxy-6-demethyl-6-methylenetetracycline, 11a-dehalogenation may be accomplished by either chemical or catalytic reduction using the procedure well known to those in the art. Example XXXVII appearing hereinafter illustrates hydrogenation reduction of an 11a-chloro-6-deoxy-6-demethyl-6-methylenetetracycline hydrochloride to obtain the corresponding 11a-deschloro compound and also shows that the 11a-fluoro group is not susceptible to reduction by this method. Instead, 11a-fluoro groups are eliminated in the desired starting materials by reduction procedures such as illustrated in Example IV, method D, wherein chemical reduction employing zinc dust and dilute hydrochloric acid is employed.

The preparation of the 9-amino starting materials for the process of the present invention may be accomplished by reduction of the corresponding 9-nitro compound using the methods generally employed for converting nitro compounds to amino compounds. Such procedures are well illustrated by Examples XIII, XIV and XXX. The acylated 9-amino starting compounds of the present invention are also prepared by the usual methods recognized by those in the art. The preferred method involves acylation of the 9-amino-6-deoxy-6-demethyl-6-methylenetetracycline with the desired acid anhydride or an equivalent thereof such as the acid chloride in the presence of a base, e.g., a tertiary amine such as pyridine, and in a reaction inert solvent. Examples XVIII and XIX, among others, illustrate such acylation techniques.

An indicated above, the reduction of the 6-methylene group of a selected starting compound in accordance with the present invention can result in the removal of a 7-halo substituent thereof and does result in the removal of an 11a-chloro substituent. Should such substituents be desired in the final mixed product or either of its components, namely the 6-epi-6-deoxytetracycline or 6-deoxytetracycline, they may be reintroduced by the chlorination technique described above and illustrated by Examples XLI–XLV. Furthermore, and assuming the use of an 11a-fluoro substituted starting compound during reduction of the 6-methylene group, such group may be subsequently removed by the procedure described in Example XXXVIII.

Selection of a 9-nitro-6-deoxy-6-demethyl-6-methylenetetracycline as a starting material for the reduction process of the present invention will result in reduction of the 9-nitro group to a 9-amino group. Accordingly, and if the desired product is a 9-nitro-6-deoxytetracycline of either normal or epimeric configuration, such 9-nitro group should be introduced into the product of the reduction process of the present invention by the same nitration means hereinbefore described and illustrated in Examples L, LIV, LV, LVI and LVIII.

In view of the acid stability of the 6-deoxy products of the process of the present invention, the 9-amino substituted derivatives thereof such as 6-epi-6-deoxy-9-amino-5-oxytetracycline may be converted to the corresponding 9-chloro compound. This procedure involves diazotization followed by conventional Sandmeyer reaction and is illustrated in Example LIII hereof. It will further be appreciated that this Sandmeyer reaction can be applied to the preparation of other halides, nitriles, etc.

Direct nitration of the final products or the starting materials of the process of the present invention favors substitution at the 9-position, trace amounts of the 7-nitro derivatives being occasionally detected. For the purpose of preparing 7-amino starting materials or 7-amino final products of the present invention, the preferred method involves preparation of a corresponding 7-aromatic azo compound followed by reduction to produce the desired 7-amino compound, catalytic hydrogenation in the presence of a noble metal catalyst being preferred for such reduction. Generally speaking, any diazotizable aromatic primary amine may be employed for producing the 7-azo compounds, it being essential that an 11a-halogen blocking group or other appropriate blocking group be present in order to protect the 11,12-enolic position. During the coupling reaction, it is preferred to employ an excess of the diazonium salt and to utilize reaction temperatures of 0–10° C. An aqueous solvent system such as a 50% aqueous solution of a water soluble lower alkanol or ketone is suitable. Examples XLVI–XLVII herein illustrate diazonium coupling followed by reduction to obtain a 7-amino compound.

The above description of the process of the present invention indicates that D-ring substitution of the final products may be obtained through appropriate selection of a D-ring substituted starting material or by appropriate D-ring substitution of the selected 6-epi-6-deoxytetracycline or 6-deoxytetracycline. In general, the preferred procedure involves D-ring substitution of the product of the hydrogenation process claimed herein since the resulting yields are normally higher.

In summary of the process of the present invention, it will be appreciated that it not only provides a convenient means for producing new and useful 6-epi-6-deoxytetracyclines but in addition, also produces known 6-deoxytetracyclines. Whereas the latter compounds may be produced by hydrogenation of a parent tetracycline antibiotic, i.e., one containing both a 6-methyl and a 6-hydroxy substituent, the procedure of the present invention is preferred since the yields thereof are substantially higher than those obtained by the known procedure.

Hydrogenation of the 6-deoxy-6-demethyl-6-methylenetetracycline starting materials of the present invention, when carried out under the preferred acidic conditions sometimes produces a minor proportion of 4-epi products as well. If desired, such 4-epi compounds could be separated from the compounds having a normal configuration at the 4-position by conventional paper chromatography. Additionally, the 4-desdimethylamino analogs of the previously defined starting compounds of the present invention, could be employed to produce 4-desdimethylamino analogs of the products thereof.

The products of the present invention include the 6-epi-6-deoxy-, 6-epi-6-deoxy-7-substituted-, 6-epi-6-deoxy-9-substituted-, 6-epi-6-deoxy-11a-chloro-, 6-epi-6-deoxy-11a-fluoro-, 6-epi-6-deoxy, 7,11a-dichloro-, 6-epi-6-deoxy-7-substituted-9-substituted-, and 11a-fluoro- and chloro-analogs of the latter compound and 6-epi-6-deoxy-7-chloro-11a fluorotetracyclines, both with and without the 5-hydroxyl substituent, as well as the acid addition salts thereof and the pharmaceutically acceptable metal salts thereof, the substituents of the 7- and 9-positions being selected from the group consisting of chloro, bromo, iodo, nitro, amino and lower alkanoyl amino. Of these, a prefered group of compounds are those including a 5-hydroxyl substituent, since they are found to have particularly good in vivo effectiveness.

The novel compounds described immediately above with the exception of the 9-nitro compounds, are useful by virtue of their high order of activity against a variety of microorganisms, both in vivo and in vitro. 9-nitro compounds generally are of a lower order of activity. These nitro compounds are useful for the preparation of the corresponding 9-amino compounds as described herein.

The following table summarizes the in vitro activity of 6-epi-6-deoxy-5-oxytetracycline (1) as compared with 6-deoxy-5-oxytetracycline hydrochloride (2) against a variety of disease-causing microorganisms. The minimum inhibitory concentration (MIC) is determined by the well known serial dilution technique.

| Organism | MIC (mcg./ml.) | |
|---|---|---|
| | (1) | (2) |
| Micrococcus pyogenes var. aureus | 0.78 | 0.78 |
| Streptococcus pyogenes | 0.09 | 0.09 |
| Streptococcus faecalis | 0.39 | 0.78 |
| Diplococcus pneumoniae | 0.19 (p.i.) | 0.39 |
| Erysipelothrix rhusiopathiae | 0.39 | 0.39 |
| Corynebacterium diphtheriae | 0.19 | 1.56 |
| Listeria monocytogenes | 0.19 | 1.56 |
| Bacillus subtilis | 0.19 | 0.19 |
| Bacterium ammoniagenes | | 0.78 |
| Aerobacter aerogenes | 6.3 | 12.5 |
| Escherichia coli | 3.12 | 12.5 |
| Proteus vulgaris | 100 | >200 |
| Pseudomonas aeruginosa | 12.5 | >200 |
| Salmonella typhosa | 6.3 | 6.3 |
| Salmonella gallinarum | 3.12 | 12.5 |
| Klebsiella pneumoniae | 3.16 | 6.3 |
| Neisseria gonorrhoeae | 0.09 | 6.3 |
| Hemophilus influenzae | 0.09 | 0.39 |
| Shigella sonnei | 3.12 | 6.3 |
| Brucella bronchiseptica | 0.78 | 3.12 |
| Malleomyces mallei | 0.78 | 25 |
| Vibrio comma | 0.39 | 6.3 |
| Pasteurella multocida | 0.19 | |
| Streptococcus agalactiae | 0.19 | |
| Antibiotic resistant strains of Micrococcus pyogenes var. aureus: | | |
| 376 | 6.3 (p.i.) | >200 |
| 400 | 6.3 (p.i.) | 200 |

(p.i.) = partial inhibition.

The following tabulated data compares the properties of 6-epi-6-deoxy-5-oxytetracycline (1) and 6-dexoy-5-oxytetracycline (2):

PROPERTIES OF 6-DEOXY-5-OXYTETRACYCLINES

| | (1) | (2) |
|---|---|---|
| Bioactivity vs. *K. pneumoniae* (oxytetracycline standard). | Ca. 1,500 u./mg. | Ca. 500 u./mg. |
| $\lambda_{max}$. HCl-methanol | 267 ($\epsilon$=17,300) | 266 ($\epsilon$=18,100). |
| | 351 ($\epsilon$=13,200) | 343 ($\epsilon$=13,200). |
| $R_f$ [1] | 0.5 | 0.3. |

[1] Chromatography on paper saturated with pH 3.5 aqueous McIlvaine buffer, developed 1 hour with 20:10:3 by volume nitromethane:chloroform:pyridine.

The present new 6-epi-6-deoxytetracycline compounds may be formulated into various compositions analogous to the parent tetracyclines from which they are derived. They are useful therapeutically in feeds or as growth stimulants, in veterinary practice and in agriculture.

For human therapy, the usual oral dosage of the present new compounds is from about 0.1 to about 2 g. per day for the average adult. The product is formulated into capsules or tablets containing from 25 to 250 mg. of antibiotic on an activity basis. Suspensions or solutions in various vehicles are prepared using concentrations ranging from 5 to 125 mg./ml. For parenteral administration intramuscularly or intravenously, the daily dose is reduced to about .05 to 1.0 g. Intramuscular formulations comprise solutions of the antibiotic at concentrations ranging from 50 to 100 mg./ml. Intravenous administration is by means of isotonic solutions having antibiotic concentration of about 10 mg./ml. Both types of parenteral products are conveniently distributed as solid compositions for reconstitution. These products may also be used for topical applications in the usual extending media. In all instances, of course, the attending physician will indicate the dosage to fit the needs of a particular patient. For children, smaller doses are generally used.

The present invention embraces all salts, including acid-addition and metal salts, of the newly recognized amphoteric antibiotics. The well known procedures for preparing salts of tetracycline compounds are applicable here and are illustrated by examples appearing hereinafter. Such salts may be formed with both pharmaceutically acceptable and pharmaceutically unacceptable acids and metals. By "pharmaceutically acceptable" is meant those salt-forming acids and metals which do not substantially increase the toxicity of the amphoteric antimicrobial agent. The preferred salts are the acid addition salts and pharmaceutically acceptable metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g., p-toluenesulfonic acids, and the like. The pharmaceutically unacceptable acid addition salts, while not useful for therapy, are valuable for isolation and purification of the newly recognized antibiotic. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochloride, by solution in hydrochloric acid and crystallization of the hydrochloride salt formed. The perchloric acid salts are useful for purification and crystallization of the new antibiotic.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20 i.e. magnesium and calcium, and additionally, aluminum, zinc, iron and manganese, among others. Of course, the metal salts include complex salts, i.e. metal chelates, which are well recognized in the tetracycline art. The pharmaceutically unacceptable metal salts embrace most commonly salts of lithim and of alkaline earth metals of atomic number greater than 20, i.e. barium and strontium, which are useful for isolation and purifying the antibiotic. Since the new antibiotic is amphoteric, it also forms salts with amines of sufficient basicity.

It will be obvious that, in addition to their value in therapy, the pharmaceutically acceptable acid and metal salts are also useful in isolation and purification.

The following examples are given by way of illustration and are not to be construed as limitations of this invention, many variations of which are possible within the scope and spirit thereof.

EXAMPLE I

*11a-fluoro-5-oxytetracycline-6,12-hemiketal*

To a mixture of 6.9 g. of anhydrous oxytetracycline base dissolved in 285 ml. of methanol cooled in an ice bath is added 1 equivalent of 1 N sodium methoxide-methanol solution. The yellow sodium salt precipitates. Perchloryl fluoride is bubbled in and the sodium salt redissolves. As the mixture nears neutrality a heavy precipitate starts to form. The excess perchloryl fluoride is swept out with a stream of nitrogen, the product filtered off, washed with cold methanol and dried under vacuum at room temperature to obtain 5.1 g. of pale yellow crystals. Infrared absorption shows no carbonyl absorption below 6 microns. Bioassay against *K pneumoniae* shows an activity of 4 mcg./mg. on the tetracycline scale. Ultraviolet absorption shows maxima at 265 and 336 millimicrons. Elemental analysis gives the following results after recrystallization of the product from water.

Calcd. for $C_{22}H_{23}O_9N_2F \cdot 2H_2O$: C, 51.4; H, 5.25, N, 5.5. Found: C, 51.2; H, 5.3, N, 5.7.

EXAMPLE II

*11a-chloro-5-oxytetracycline-6,12-hemiketal*

Twenty-three grams of anhydrous oxytetracycline is dissolved in 250 ml. of 1,2-dimethoxyethane and 8 g. of N-chlorosuccinimide is next added. The mixture is stirred for two minutes and then poured into 1 liter of stirred water. The product which separates is collected by filtration water-washed and dried. Infrared analysis of the product (KBr at 1% concentration) shows no carbonyl absorption in the 5–6 micron region but shows the following principal peaks: 6.12, 6.35, 6.66, 6.85, 7.22, 7.55, 7.75, 7.92, 8.14, 8.36, 8.78, 9.18, 9.43 microns. Bioassay of the product shows a tetracycline activity of 4 mcg./mg.

EXAMPLE III

*11a-chloro-6-deoxy-6-demethyl-6-methylene-5-oxytetracycline*

Five grams of 11a-chloro-5-oxytetracycline-6,12-hemiketal is added to 15 ml. of dry, liquid hydrogen fluoride, and the mixture is stirred for 3.5 hours at ice-bath temperature. The hydrogen fluoride is evaporated off by warming under a flow of nitrogen gas to obtain the product as the hydrofluoride salt.

The crude hydrofluoride product is dissolved in water and conc. HCl or perchloric acid (70%) is added dropwise to precipitate the hydrochloride or perchlorate salts respectively. The hydriodide salt is precipitated from acetone solution of the crude hydrofluoride salt by addition of 47% hydriodic acid.

Alternatively, the original reaction mixture is diluted with 6–7 volumes of water and ice and perchloric acid or naphthalene sulfonic acid (concentrated acid) is added to precipitate the respective salt. Dilution with acetone of the original reaction mixture followed by addition of HI, precipitates the hydriodide salt.

The hydriodide salt, on elemental analysis, shows the following values.

Calcd. for $C_{22}H_{21}N_2O_8ClHI$: C, 43.7; H, 3.7; N, 4.6; Cl, 5.8. Found: C, 44.0; H, 4.0; N, 4.2; Cl, 5.5.

Ultraviolet analysis shows the following maxima: 222, 270 and 372 m$\mu$. Infrared analysis shows principal peaks at 3.05, 3.2, 5.77, 6.02, 6.03, 6.22, 6.4, 6.88, 7.4, 7.8, 8.1, 8.9 and 9.1 microns. The perchlorate salt on ultraviolet analysis shows maxima at 237, 270 and 372 m$\mu$.

11a-fluoro-6-deoxy-6-demethyl-6-methylene-5-oxytetracycline is prepared in the same manner using 11a-fluoro-5-oxytetracycline-6,12-hemiketal as the starting compound.

EXAMPLE IV

*6-deoxy-6-demethyl-6-methylene-5-oxytetracycline*

Method A.—To a solution of 5 g. of the Example III product (as the hydriodide) in 125 ml. of dilute hydrochloric acid (1 part conc. HCl in 55 parts of water) at 20° C. is added 2 g. of zinc dust. After stirring for 10 minutes, the zinc is filtered off, the filtrate adjusted to pH 0.8 and extracted with butanol. The butanol extract is concentrated under reduced pressure to a residue which is triturated with ether. The ether-insoluble residue is crystallized from methanol-acetone-conc. HCl-ether to obtain the product as the hydrochloride-monomethanolate (2.5 g.) melting at 205° C. with decomposition. Ultraviolet analysis in 0.01 N HCl in methanol shows $\lambda_{max}$. 252 m$\mu$, $E_{1cm}^{1\%}$ 450; and $\lambda_{max}$. 345 m$\mu$, $E_{1cm}^{1\%}$ 302; in 0.01 N NaOH in methanol, $\lambda_{max}$. 235 m$\mu$, $E_{1cm}^{1\%}$ 442; $\lambda_{max}$. 254 m$\mu$, $E_{1cm}^{1\%}$ 408; $\lambda_{max}$. 385 m$\mu$, $E_{1cm}^{1\%}$ 329; $\lambda_{inf}$ 280 m$\mu$, $E_{1cm}^{1\%}$ 329; in 0.01 N MgCl$_2$ in methanol, $\lambda_{max}$. 240 m$\mu$, $E_{1cm}^{1\%}$ 461; $\lambda_{max}$. 277 m$\mu$, $E_{1cm}^{1\%}$ 326; $\lambda_{max}$. 351 m$\mu$, $E_{1mc}^{1\%}$. 282.

Infrared analysis shows principal peaks at 6.03, 6.2, 6.37 and 6.87 microns. Bioassay shows a value of 2000 to 2400 mcg./mg. (*K. pneumoniae* turbimetric assay with oxytetracycline as standard). Elemental analysis of the product gives the following values: C, 55.0; H, 5.2; N, 5.5; Cl, 7.0; OCH$_3$, 3.4. The product shows R$_f$ values of 0 and 0.35 respectively in the following systems:

| Mobile Phase | Immobile phase |
|---|---|
| (1) 20:3 toluene-pyridine saturated with pH 4.2 buffer. | pH 4.2 buffer (aqueous). |
| (2) 20:10:3 nitromethane, chloroform pyridine saturated with pH 3.5 buffer. | pH 3.5 buffer (aqueous). |

*Method B.*—A mixture of 1 g. of the Example III 11a-chloro product in 10 ml. of methanol containing 200 mg. of 5% rhodium on carbon is hydrogenated at room temperature and 1 atomsphere of hydrogen gas until an equimolar amount of hydrogen is taken up (2 hours). The catalyst is filtered, the filtrate evaporated to dryness and the residue crystallized as in Method A.

*Method C.*—A mixture of 1 g. of the Example III 11a-chloro product in 70 ml. of water containing 1 g. of sodium hydrosulfite is stirred for 0.5 hour at room temperature. The mixture is then extracted with butanol and the butanol extract evaporated to dryness. The product is crystallized from the residue as in Method A.

*Method D.*—Using the procedure of Method A, 11a-fluoro-6-deoxy-6-demethyl - 6 - methylene - 5 - oxytetracycline perchlorate salt is reduced to 6-deoxy-6-demethyl-6-methylene-5-oxytetracycline.

The crystalline hydrochloride-methanolate product of this example may be recrystallized from isopropanol as 6-deoxy-6-demethyl-6-methylene - 5 - oxytetracycline hydrochloride. The recrystallized material shows the following peaks on infrared analysis: 3.1, 3.75, 6.02, 6.23, 6.36, 6.55, 6.9, 7.35, 7.6, 7.8, 8.15, 8.26, 8.5, 9.27, 9.95, 10.55, 10.8, 11.53, 11.93 and 12.15 microns.

EXAMPLE V

*7,11a-dichloro-6-deoxy-6-demethyl-6-methylene-5-oxytetracycline*

*Method A.*—To 5 g. of 11a-chloro-6-deoxy-6-demethyl-6-methylene-5-oxytetracycline hydriodide in 15 ml. of liquid hydrogen fluoride cooled at ice bath temperature, is added 1.5 g. of N-chloro-succinimide. The solution is stirred at ice bath temperature for 1.5 hours. The crude product is precipitated by the addition of 500 ml. of ether and recovered by filtration.

The crude product is taken up in methanol at room temperature, the insoluble material is filtered, the filtrate treated with activated carbon, filtered and concentrated under reduced pressure. The remaining residue is taken up in dil. hydrochloric acid from which the product, as the hydrochloride, crystallizes. Ultraviolet analysis in 0.01 N HCl in methanol shows $\lambda_{max}$. 239 m$\mu$, $E_{1 cm}^{1\%}$ 352; $\lambda_{max}$. 378 m$\mu$, $E_{1 cm}^{1\%}$. 60; $\lambda_{inflection}$ 258 m$\mu$, $E_{1 cm}^{1\%}$. 324

Infrared analysis shows principal bands at 5.7, 6.0 and 6.9 microns.

*Method B.*—Five grams of 11a-chloro-5-oxytetracycline-6,12-hemiketal is added to 15 ml. of liquid hydrogen fluoride at ice-bath temperature. After stirring for 3.5 hours at ice bath temperature, the procedure in Method A is then followed after addition of the same weight of N-chlorosuccinimide to obtain the product.

An alternative and somewhat more convenient method of work up is as follows. After the removal of most of the liquid hydrogen fluoride, 100 ml. of water is added and then 5 g. of β-naphthalenesulfonic acid is added. The product precipitates as the β-naphthalenesulfonic acid salt and is collected by filtration.

A further method of work-up involves dilution of the original reaction mixture with 6–7 volumes of water and is followed by dropwise addition of concentrated acid to precipitate the perchlorate and β-naphthalene sulfonate salts as described in Example III. The crude perchlorate salt so obtained is crystallized as long needles from isopropanol, which on ultraviolet analysis shows maxima at 260 and 377 m$\mu$ and an inflection at 260m$\mu$. Infrared analysis shows peaks at 5.7, 6.0, 6.26, 6.55, 6.88, 7.2, 7.85 and 8.35 microns.

EXAMPLE VI

*7-chloro-6-deoxy-6-demethyl-6-methylene-5-oxytetracycline*

*Method A.*—To a solution of 0.5 g. of the 7,11a-dichloro-6-deoxy -6- demethyl -6- methylene -5- oxytetracycline perchlorate in 7.5 ml. of water is added 0.45 g. of sodium hydrosulfite and the resulting mixture is stirred for 12 minutes. The product separates and is collected by filtration. Bioassay of the product gives a value of 3400 mcg./mg. (*K. pneumoniae* turbimetric assay with oxytetracycline (1000 mcg./mg.) as the standard).

*Method B.*—Twenty grams of the β-naphthalene sulfonate salt of the previous example is suspendeed in 500 ml. of methanol containing 5 g. of 5% rhodium on carbon and the mixture hydrogenated at room temperature and 1 atmosphere of hydrogen gas. After the uptake of 700 ml. of hydrogen, the reaction is filtered and the filtrate evaporated to dryness to obtain 15.4 g. of residue.

A methanolic solution of 11 g. of the residue is then adjusted to pH 6.5 with triethylamine and passed onto an 8 x 100 cm. column containing 2 kg. of cellulose powder using water as stationary phase. The column is eluted with ethyl acetate saturated with water and 45 ml. fractions are collected. The elution pattern is followed by paper chromatography and fractions 132 to 260 are pooled, evaporated to dryness, slurried in ether and filtered to give 2.74 g. of pure amorphous amphoteric product.

The product is crystallized by dissolving 1.6 g. in 40 ml. of warm methanol and scratching. Filtration gives 890 mg. of the product as the amphoteric base. Infrared analysis shows the following peaks: 2.96, 3.29, 3.42, 6.06, 6.18, 6.30, 6.58, 6.88, 7.19, 7.48, 7.70, 8.23, 9.06, 9.88, 10.63, 10.92, 11.55 and 11.76 microns. Ultraviolet analysis shows the following: in 0.01 N HCl in methanol, maxima at 247 m$\mu$ (log $\epsilon$ 4.28) and 346 m$\mu$ (log $\epsilon$ 4.02) and an inflection at 370 m$\mu$ (log $\epsilon$ 3.98); in 0.01 N NaOH in methanol, maxima at 234 m$\mu$ (log $\epsilon$ 4.24), 253 m$\mu$ (log $\epsilon$ 4.22) and 389 m$\mu$ (log $\epsilon$ 4.12) and an inflection at 284 m$\mu$ (log $\epsilon$ 4.07); in 0.01 M MgCl$_2$ in methanol, maxima at 241 m$\mu$ (log $\epsilon$ 4.32); 349 m$\mu$ (log $\epsilon$ 4.04); and 372 m$\mu$ (shoulder) (log $\epsilon$ 4.02).

The product shows the following R$_f$ values in the indicated solvent systems:

| R$_f$ Value | Solvent System | |
|---|---|---|
| | Mobile Phase | Immobile Phase |
| 0.35 | Ethyl acetate saturated with water. | Aqueous phosphate buffer (pH 3). |
| 0.33 | ----do---- | McIlvaine's buffer, pH 4.2. |

Bioassay (*K. pneumoniae*, oxytetracycline standard) gives a value of 6000 mcg./mg.

The crystalline perchlorate salt of the product of the preceding example is hydrogenated to give this product which is crystallized from methanol and 70% perchloric acid. The perchlorate salt of the product shows identical ultraviolet spectra to that of the amphoteric base.

*Method C.*—This product is also obtained by reduction of the starting compound of Method A with zinc and acid according to the procedure of Example IV.

EXAMPLE VII

*7-bromo-11a-chloro-6-deoxy-6-demethyl-6-methylene-5-oxytetracycline*

This product is prepared according to the procedures of Method A and B of Example V using an equivalent amount of N-bromosuccinimide in place of N-chlorosuccinimide.

EXAMPLE VIII

*7-bromo-6-deoxy-6-demethyl-6-methylene-5-oxytetracyclone*

This product is obtained from Example VII product by the sodium hydrosulfite treatment described in Example VI.

The following compounds are prepared from the corresponding 11a-halo compounds by the procedure of the previous examples:

7-chloro-11a-fluoro-6-deoxy-6-demethyl-6-methylene-5-oxytetracycline
7-iodo-11a-chloro-6-deoxy-6-demethyl-6-methylene-5-oxytetracycline
7-bromo-11a-fluoro-6-deoxy-6-demethyl-6-methylene-5-oxytetracycline These compounds are converted to the corresponding 11a-deshalo compounds by the aforementioned procedures.

EXAMPLE IX

*7-chloro-9-nitro-6-deoxy-6-demethyl-6-methylene-5-oxytetracycline*

To a solution of 1.0 g. of 7-chloro-6-deoxy-6-demethyl-6-methylene-5-oxytetracycline base in 8 ml. of anhydrous liquid hydrogen fluoride (HF) at 0° C. is added 220 mg. of $KNO_3$. The mixture is stirred for 30 minutes at 0° C. and the HF evaporated off under nitrogen. The residue is slurried in dry ether, filtered and dried. The product shows the following $R_f$ values in the solvent systems indicated:

| $R_f$ | Solvent System | |
|---|---|---|
| | Mobile Phase | Immobile Phase |
| 0.2 | Ethylacetate saturated with water. | Aqueous phosphate buffer (pH=3). |
| 0.55 | Nitromethane, toluene, pyridine (20:10:3). | McIlvaine's buffer (pH=3.5). |

Ultraviolet analysis in 0.01 M NaOH—MeOH shows maxima at 248, 341 and 447 m$\mu$ and a shoulder at 275 m$\mu$. Bioassay shows a value of less than 100 mcg./mg. (*K. pneumoniae* turbimetric assay with oxytetracycline standard).

EXAMPLE X

*9-nitro-7,11a-dichloro-6-deoxy-6-demethyl-6-methylene-5-oxytetracycline*

To a solution of 600 mg. of 7,11a-dichloro-6-deoxy-6-demethyl-6-methylene-5-oxytetracycline perchlorate in 1.5 ml. of anhydrous liquid hydrogen fluoride is added 100 mg. of $KNO_3$. The mixture is stirred at 5° C. for 15 minutes, and the product is then precipitated with ether and collected by filtration, with ether wash.

EXAMPLE XI

*9-nitro-6-deoxy-6-demethyl-6-methylene-5-oxytetracycline*

To a mixture of 500 mg. of 6-deoxy-6-demethyl-6-methylene-5-oxytetracycline in 1.5 ml. of anhydrous liquid hydrogen fluoride is added 100 mg. of $KNO_3$. The mixture is stirred at 15° C. for 30 minutes and then evaporated to dryness. The residue is slurried in ether and filtered to obtain the crude product which is slurried in 5% aqueous HCl and extracted with butanol. The butanol extract is concentrated to obtain the product.

EXAMPLE XII

*9-nitro-11a-chloro-6-deoxy-6-demethyl-6-methylene-5-oxytetracycline*

A solution of 5 g. of 11a-chloro-5-oxytetracycline-6,12-hemiketal in 10 ml. of anhydrous hydrogen fluoride is allowed to stand for 3½ hours after which 1.2 g. of $KNO_3$ is added with stirring. Stirring is continued for one hour at ice bath temperature and the mixture is then added to 200 ml. of dry ether, filtered and washed with ether to obtain crude product.

EXAMPLE XIII

*7-chloro-9-amino-6-deoxy-6-demethyl-6-methylene-5-oxytetracycline*

To a solution of 1.42 g. of 7-chloro-9-nitro-6-deoxy-6-demethyl-6-methylene-5-oxytetracycline dissolved in 50 ml. of water and 2 ml. of conc. HCl is added 1.3 g. of zinc dust with stirring at 20° C. After 15 minutes, the mixture is filtered, the pH adjusted to 2.5 and the mixture is extracted with butanol (5 x 30 ml.). The butanol extract on concentration gives 760 mg. of the product (as dihydrochloride). Bioassay (*K. pneumoniae*) gives a value of 1680 mcg./mg. Ultraviolet analysis in 0.01 N MeOH—HCl shows maxima at 262 and 348 m$\mu$; in 0.01 N MeOH—NaOH, 264 and 380 m$\mu$.

The product shows $R_f$ values as follows:

| $R_f$ | Solvent System | |
|---|---|---|
| | Mobile Phase | Immobile Phase |
| 0.2 | Ethyl acetate saturated with water. | Aqueous buffer (pH=3). |
| 0.35 | Nitromethane, chloroform, pyridine (20:10:3). | McIlvaine's pH 3.5 buffer. |

This product is also obtained by reduction (with aqueous sodium hydrosulfite) of 9-nitro-7,11a-dichloro-6-deoxy-6-demethyl-5-oxytetracycline.

EXAMPLE XIV

*9-amino-6-deoxy-6-demethyl-6-methylene-5-oxytetracycline*

This product is obtained by reduction of the corresponding 9-nitro compound with sodium hydrosulfite in water or with $SnCl_2$ in aqueous hydrochloric acid.

EXAMPLE XV

*9-nitro-11a-chloro-6-deoxy-6-demethyl-6-methylene-5-oxytetracycline*

To 1 g. of 11a-chloro-6-deoxy-6-demethyl-6-methylene-5-oxytetracycline in 20 ml. of acetic acid is added 1 ml. of conc. $HNO_3$. The mixture is allowed to stand for 2 hours, then evaporated to ¼ of the original volume and 200 ml. of ether is then added. The product separates as the nitrate salt and is collected by filtration.

Similarly, the corresponding 11a-fluoro compound is prepared.

EXAMPLE XVI

*9-amino-6-deoxy-6-demethyl-6-methylene-5-oxytetracycline*

The product of the previous example is reduced according to the procedures of Example IB to obtain this compound.

This product is also obtained by chemical or catalytic reduction of 9-nitro-6-deoxy-6-demethyl-6-methylene-5-oxytetracycline.

EXAMPLE XVII

*7,11a-dichloro-9-nitro-6-deoxy-6-demethyl-6-methylene-5-oxytetracycline*

One gram of 7,11a-dichloro-6-deoxy-6-demethyl-6-methylene-5-oxytetracycline hydrochloride is dissolved in 20 ml. of acetic acid and 1 ml. of conc. $HNO_3$ is added. The mixture is allowed to stand for 12 hours and then concentrated to ¼ of the original volume. It is added dropwise to 200 ml. of ether with stirring at ice-bath temperature. Stirring is continued for 3 hours and the solid is then recovered by filtration. The solid is slurried several times in ether and then dried to obtain the product as the hydrochloride salt.

Using the same procedure, the following products are obtained from corresponding starting compounds:

7-chloro-11a-fluoro-9-nitro-6-deoxy-6-demethyl-6-methylene-5-oxytetracycline
7-bromo-11a-chloro-9-nitro-6-deoxy-6-demethyl-6-methylene-5-oxytetracycline
7-chloro-11a-fluoro-9-nitro-6-deoxy-6-demethyl-6-methylene-5-oxytetracycline
7-iodo-11a-fluoro-9-nitro-6-deoxy-6-demethyl-6-methylene-5-oxytetracycline These products are converted to 7-bromo-, 7-iodo- and 7 - chloro-9-amino-6-deoxy - 6 - demethyl-6-methylene-5-oxytetracycline by the reduction procedures of the previous examples.

EXAMPLE XVIII

*9-formylamino-6-deoxy-6-demethyl-6-methylene-5-oxytetracycline*

To a solution of 4.5 g. of 9-amino-6-deoxy-6-demethyl-6-methylene-5-oxytetracycline base in 40 ml. of dry pyridine is added 20 ml. of aceto-formic acid at ice bath temperature. The mixture is stirred for 15 minutes at ice bath temperature and added dropwise to one liter of dry ether. The product is filtered, reslurried in ether and filtered.

The crude product is suspended in 100 ml. of water providing a solution of pH=4.2 and stirred for ten minutes to hydrolyze O-formyl groups. The pH of the mixture is then adjusted to pH 5.5 and the solution freeze-dried to get crude product which is chromatographed on a cellulose column to obtain purified product as the main fraction.

EXAMPLE XIX

*9-acetylamino-6-deoxy-6-demethyl-6-methylene-5-oxytetracycline*

To a solution of 4.2 g. of the starting compound of Example XVIII in 200 ml. of dry tetrahydrofuran and 200 ml. of dry methanol is added 20 ml. of acetic anhydride and the mixture is stirred for 45 minutes at room temperature. The mixture is then stripped of most of the solvent and dropped into dry ether, filtered and the solid cake reslurried in ether, filtered and dried to obtain crude product.

The crude product is chromatographed as in Example XVIII to obtain purified product as the main fraction.

Employing the procedures of Examples XVIII and XIX, the following products are prepared:

9-formylamino-7-chloro-6-deoxy-6-demethyl-6-methylene-5-oxytetracycline
9-acetylamino-7-chloro-6-deoxy-6-demethyl-6-methylene-5-oxytetracycline
9-butyrylamino-7-chloro-6-deoxy-6-demethyl-6-methylene-5-oxytetracycline
9-propionylamino-6-deoxy-6-demethyl-6-methylene-5-oxytetracycline
9-valerylamino-6-deoxy-6-demethyl-6-methylene-5-oxytetracycline

EXAMPLE XX

*11a-chlorotetracycline-6,12-hemiketal*

This compound is prepared in accordance with the method of Example II by substituting an equivalent amount of tetracycline for the oxytetracycline of Example II.

EXAMPLE XXI

*7,11a-dichlorotetracycline-6,12-hemiketal*

This compound is prepared in accordance with the method of Example XX by employing an equivalent amount of chlorotetracycline, substituting ether or ether-hexane instead of water to precipitate the product.

EXAMPLE XXII

*11a-chloro-6-deoxy-6-demethyl-6-methylenetetracycline*

11a-Chlorotetracycline-6,12-hemiketal is dissolved in liquid hydrogen fluoride (in a ratio of 2 g./15 ml.) at 0° C. The mixture is maintained at this temperature for 10-15 minutes, after which the hydrogen fluoride is evaporated off. The residue is triturated in ether to obtain the solid product, 11a-chloro-6-deoxy-6-demethyl-6-methylenetetracycline, as the hydrofluoride salt which is recrystallized from methanol.

Alternatively, the crude hydrofluoride product (10 g.) is dissolved in 350 ml. of $H_2O$ by warming and stirring. An equal volume of conc. HCl is added to the clear solution and the product crystallizes as the hydrochloride salt. Elemental analysis of the hydrochloride salt thus obtained gives the following results:

Calcd. for $C_{22}H_{22}O_7N_2Cl_2$: C, 53.11; H, 4.56; chloride, 7.13; N, 5.63. Found: C, 52.62; H, 4.63; chloride, 6.84; N, 5.54.

Infrared analysis of the product as the hydrochloride salt in a KBr pellet at 1% concentration shows carbonyl absorption at 5.70 as well as the following significant peaks: 6.1, 6.23, 6.36, 6.45 (shoulder), 6.91, 7.85, 8.14, 8.55, 10.22, 10.55 and 10.89. Bioassay of the product (*K. pneumoniae*) shows an oxytetracycline activity of 50–100 mcg./mg. Ultraviolet analysis of the sample in 0.01 N methanol-HCl shows maxima at 376, 278 and 242 m$\mu$. The product shows an $R_f$ value of from 0.2 to 0.3 in the following system:

| Mobile Phase | Immobile Phase |
| --- | --- |
| 20:3 toluene-pyridine saturated with pH 4.2 buffer. | pH 4.2 buffer (aqueous). |

On analysis of the papergram with ultraviolet light, the product spot does not fluoresce strongly. However, on spraying with aqueous sodium hydrosulfite, it shows strong fluorescence.

The C.4 epimer of the product, present as a minor impurity, shows $R_f$ 0.1 in this system.

EXAMPLE XXIII

*11a-fluoro-6-deoxy-6-demethyl-6-methylenetetracycline*

11a-fluorotetracycline-6,12-hemiketal, 250 mg. is stirred in 2 ml. of 63% aqueous perchloric acid. The solid dissolved on warming to 60°–65° C. for 15 minutes after which the mixture is cooled and water is added to obtain 11a-fluoro-6-deoxy-6-demethyl-6-methylenetetracycline as the chlorate salt. The product shows similar absorption on ultraviolet analysis as that of Example XXII.

EXAMPLE XXIV

The following compounds are prepared from corresponding 11a-halotetracycline-6,12-hemiketals, the 11a-fluoro compound by the procedure of Example XXIII and the remaining 11a-halo compounds by the procedure of Example XXII:

7,11a-dichloro-6-deoxy-6-demethyl-6-methylenetetracycline
7-chloro-11a-fluoro-6-deoxy-6-demethyl-6-methylenetetracycline
7-bromo-11a-chloro-6-deoxy-6-demethyl-6-methylenetetracycline
7-iodo-11a-chloro-6-deoxy-6-demethyl-6-methylenetetracycline

EXAMPLE XXV

*6-deoxy-6-demethyl-6-methylenetetracycline*

Method A.—The product of Example XXII (5 mg.) is dissolved in 3 ml. of methanol and a freshly prepared solution of sodium hydrosulfite (20 mg. in 2 ml. of water) is added. The mixture is allowed to stand for 15 minutes at room temperature, after which it is stripped of methanol and extracted with butanol. The butanol extract is concentrated to obtain the product, 6-deoxy-6-demethyl-6-methylenetetracycline. The product is crystallized from water as the p-toluene-sulfonate salt by addition of p-toluenesulfonic acid. Alternatively, it is crystallized as the hydrochloride salt from water by addition of concentrated HCl.

On testing against *K. pneumoniae*, the product has an oxytetracycline activity of at least 1100 mcg./mg. The product shows an $R_f$ value of 0.6 in the same system as described in Example XXII, and shows $R_f$ 0.9 in the following system:

| Mobile Phase | Immobile Phase |
|---|---|
| 20:10:3 nitromethane:chloroform: pyridine | pH 3.5 buffer (aqueous). |

The C.4 epimer of this substance show $R_f$'s of approximately 0.4 and approximately 0.6 in the two systems.

*Method B.*—A solution of 50 g. of 11a-chloro-6-deoxy-6-demethyl-6-methylenetetracycline hydrochloride in 500 ml. of monomethyl ether of ethylene glycol is cooled to 4° C. in an ice bath and the rapidly stirred solution is treated with 50 g. of zinc metal dust at a gradual rate over a period of about 10 minutes. The temperature rises to 12° C. during addition. After addition is complete, the temperature begins to fall. After a total reaction time of 15 minutes the zinc is removed by rapid filtration and washed with solvent. One liter of water is added gradually to the filtrate over a period of about 10 minutes. A yellow slurry of the zinc complex of the product is formed. The pH of the solution is then adjusted to 6.8 with 10% aqueous sodium hydroxide.

The resulting slurry is digested for about 1.5 hours in an ice bath and filtered. The wet cake is then slurried in 750 ml. of water and conc. HCl is added dropwise until a clear solution is obtained. A slight excess of conc. HCl causes rapid crystallization of 6-deoxy-6-demethyl-6-methylenetetracycline hydrochloride as glistening needles. After digestion for one hour, the product is filtered and dried. The yield of product is 37.8 g. The product melts at 213.8–214.2° C. with decomposition.

EXAMPLE XXVI

The procedure of Example XXV is repeated to dechlorinate the 11a-chloro-6-methylenetetracyclines of the previous examples to provide the following products:

7-bromo-6-deoxy-6-demethyl-6-methylenetetracycline
7-chloro-6-deoxy-6-demethyl-6-methylenetetracycline
C.4 epimers occur as impurities.

EXAMPLE XXVII

*11a-chloro-9-nitro-6-deoxy-6-demethyl-6-methylenetetracycline*

A mixture of 1 g. of the Example XXII product in 20 ml. of acetic acid containing 1 ml. of conc. $HNO_3$ is allowed to stand for 12 hours after which the addition of 20 ml. of $H_2O$ crystallizes the product as the nitrate salt. The product is collected by filtration, water-washed and dried.

EXAMPLE XXVIII

*9-nitro-6-deoxy-6-demethyl-6-methylenetetracycline*

This product is obtained from the corresponding 11a-chloro compound (Example XXVII) by treating one gram in 70 ml. water with an equivalent of sodium hydrosulfite. The reaction mixture is stirred at room temperature for a half hour, and the desired product recovered by butanol extraction and evaporation of the extract to dryness under reduced pressure.

EXAMPLE XXIX

*7-chloro-9-nitro-6-deoxy-6-demethyl-6-methylenetetracycline*

To a solution of 1.0 g. of 7-chloro-6-deoxy-6-demethyl-6-methylenetetracycline in 8 ml. of anhydrous liquid hydrogen fluoride (HF) at 19° C. is added 220 mg. of $KNO_3$. The mixture is stirred for 30 minutes at 0° C. and the HF evaporated off under nitrogen. The residue is slurried in dry ether, filtered and dried.

EXAMPLE XXX

*7-chloro-9-amino-6-deoxy-6-demethyl-6-methylenetetracycline*

To a solution of 1.42 g. of 7-chloro-9-nitro-6-deoxy-6-demethyl-6-methylenetetracycline dissolved in 50 ml. of water and 2 ml. of concentrated HCl is added 1.3 g. of zinc dust with stirring at 20° C. After 15 minutes, the mixture is filtered, the pH adjusted at 2.5 and the mixture is extracted with butanol 5 times employing 30 ml. per extraction. The butanol extract on concentration gives the desired product as the dihydrochloride.

EXAMPLE XXXI

*7,11a-dichloro-9-nitro-6-deoxy-6-demethyl-6-methylenetetracycline*

One g. of 7,11a-dichloro-6-deoxy-6-demethyl-6-methylenetetracycline hydrochloride is dissolved in 20 ml. of acetic acid and 1 ml. of concentrated nitric acid is added. The mixture is allowed to stand for 12 hours, then concentrated to ¼ of the original volume. It is added dropwise to 200 ml. of ether with stirring at ice-bath temperature. Stirring is continued for 3 hours and the solid is then recovered by filtration. The solid is slurried several times in ether and then dried to obtain the product as the hydrochloride salt.

Using the same procedure, the following products are obtained from corresponding starting compounds:

7-chloro-11a-fluoro-9-nitro-6-deoxy-6-demethyl-6-methylenetetracycline
7-bromo-11a-chloro-9-nitro-6-deoxy-6-demethyl-6-methylenetetracycline
7-chloro-11a-fluoro-9-nitro-6-deoxy-6-demethyl-6-methylenetetracycline
7-iodo-11a-fluoro-9-nitro-6-deoxy-6-demethyl-6-methylenetetracycline These products are converted to 7-bromo-, 7-iodo- and 7-chloro-9-amino-6-deoxy-6-demethyl-6 - methylenetetracycline by the reduction procedures of the previous examples.

EXAMPLE XXXII

6-Deoxy-6-demethyl-6-methylene-5-oxytetracycline (40 g.) was introduced into a conventional hydrogenation apparatus together with 1.5 l. of 0.01 N HCl and 40 g. of 5% rhodium on carbon. Hydrogen was then introduced into the apparatus and maintained at a pressure of 1800 p.s.i. and at a temperature of 30° C. for 20 hours. Thereafter the catalyst was filtered off and the filtrate was freeze-dried to obtain 23.9 g. solids, a mixture of 6-deoxy-5-oxytetracycline and 6 - epi - 6-deoxy-5-oxytetracycline. This step yield of about 60% could be improved by employing 5% rhodium on barium sulfate carrier to thereby reduce absorption losses on the carbon catalyst carrier.

A mixture of methanol and water (25 ml. of each) was employed to dissolve 20.8 g. of the crude solids of the previous step. To this was added a solution of 20 g. sulfosalicylic acid in a mixture of methanol and water (50 ml. of each). The 6-deoxy-5-oxytetracyclines crystallized readily in the form of the sulfosalicylate salts. The slurry was then filtered and the cake washed with 50% aqueous methanol and dried to obtain 24.2 g. of salt (a 75% step yield).

Countercurrent distribution was employed to separate the 6-epi-6-deoxy-5-oxytetracycline from 6-deoxy-5-oxytetracycline. For this purpose, 500 mg. of the salt of the previous step was dissolved in 30 ml. of ethyl acetate, plus 10 ml. 2 M sodium acid phosphate. The resulting two phases were stirred and the pH adjusted to 6.8 by the addition of further $Na_2HPO_4$. The aqueous phase was then separated in the funnel and equilibrated with 30 ml. fresh ethyl acetate in the second funnel. This operation was repeated two more times with fresh portions of ethyl acetate and the aqueous phase was then set aside. Aqueous $Na_2HPO_4$—$KH_2PO_4$ buffer at pH 6.8 (10 ml.) was equilibrated with each of the ethyl acetate layers in the four funnels and then set aside. This operation was repeated two more times with fresh pH 6.8 buffer. The four ethyl acetate layers were then combined and evaporated to dryness yielding 172 mg. of substantially pure 6-epi-6-deoxy-5-oxytetracycline (about a 50% step yield). The remaining product in the aqueous buffer layers was concentrated to yield 6-deoxy-5-oxytetracycline (about a 50% step yield).

The 6-epi-6-deoxy-5-oxytetracycline product of the preceding step was finally purified by dissolving in 1 ml. methanol and adding 3 drops concentrated HCl. It crystallized as a pure hydrochloride analyzing as follows:

Found: C, 53.69; H, 5.84. Calculated: C, 53.86; H, 5.70.

This material when assayed against oxytetracycline in the *K. pneumoniae* assay showed 1400 units per milligram.

EXAMPLE XXXIII

Hydrogen was introduced into a standard hydrogenation vessel containing 10 g. 6-deoxy-6-demethyl-6-methylene-5-oxytetracycline hydrochloride, 150 ml. methanol and 5 g. 5% rhodium on carbon. The pressure was maintained at 50 p.s.i. while agitating at room temperature for 24 hours. The catalyst was then filtered off, the cake washed with methanol and the combined filtrates were evaporated to dryness. The dry solids were slurried in ether, filtered and the cake dried. The resulting solids exhibited a bioactivity of 1345 units per mg. v. *K. pneumoniae*.

Water (35 ml.) was employed to dissolve 8.5 g. of the above product and the pH was adjusted to 6.0 with triethylamine, sufficient dimethyl formamide being added to maintain the solids in solution. Cellulose powder (2 kg.) was slurried in water-saturated ethyl acetate and packed into a tower of about 3½ inches diameter, to a height of 3 ft. The product solution was then chromatographed over this column, developing with about 12 liters water-saturated ethyl acetate. The first product fraction to come from the tower yielded 1.85 g. 6-epi-6-deoxy-5-oxytetracycline. The next fraction contained 2.0 g. of 6-deoxy-6-demethyl-6-methylene-5-oxytetracycline. The third fraction yielded 0.8 g. 6-deoxy-5-oxytetracycline.

EXAMPLE XXXIV

To a solution of 500 mg. of 7-chloro-6-deoxy-6-demethyl-6-methylene-5-oxytetracycline hydrochloride in 25 ml. of methanol is added 500 mg. of 5% palladium on carbon. The suspension is hydrogenated at atmospheric pressure until no further uptake of hydrogen occurs. The catalyst is removed by filtration and the filtrate evaporated to dryness in vacuo. Paper chromatography of the residue showed high concentrations of 6-epi-6-deoxy-5-oxytetracycline, and 6-deoxy-5-oxytetracycline with traces of starting material.

The procedure of the previous paragraph is repeated employing as starting materials, the following as the hydrochlorides:

7-bromo-6-deoxy-6-demethyl - 6 - methylene-5-oxytetracycline
7-iodo-6-deoxy-6-demethyl - 6 - methylene - 5 - oxytetracycline
7-chloro-6-deoxy-6-demethyl-6-methylenetetracycline to obtain separable mixtures of the corresponding 7-deshalo-6-epi-6-deoxytetracyclines and 7-deshalo-6-deoxytetracyclines.

In a similar fashion, the hydrochlorides of 7-chloro-9-amino-6-deoxy-6-demethyl - 6 - methylene - 5-oxytetracycline, 7 - chloro - 9-acetylamino-6-deoxy-6-demethyl-6-methylene-5-oxytetracycline and 7-chloro-9-amino-6-deoxy-6-demethyl-6-methylenetetracycline are reduced to obtain separable mixtures of the corresponding 7-deshalo-9-substituted-6-epi-6-deoxytetracyclines and 7-deshalo-9-substituted-6-deoxytetracyclines.

In a similar fashion, the hydrochlorides of 7,11a-dichloro-9-nitro-6-deoxy-6 - demethyl - 6 - methylenetetracycline and 7-bromo-11a-chloro-9-nitro-6-deoxy-6-demethyl-6-methylenetetracycline are reduced to separable mixtures of 9-amino-6-epi-6-deoxytetracycline and 9-amino-6-deoxytetracycline.

EXAMPLE XXXV

To a solution of 500 mg. of 7-chloro-6-deoxy-6-demethyl-6-methylene - 5 - oxytetracycline hydrochloride and 25 ml. of methanol is added 500 mg. of 5% rhodium on carbon. The suspension is hydrogenated at a pressure of 2,000 p.s.i. until 1 mol of hydrogen has been consumed. The catalyst is removed by filtration and the filtrate evaporated to dryness in vacuo. Preparative paper chromatography using an ethyl acetate-water system is employed to isolate 7-chloro-6-epi-6-deoxy-5-oxytetracycline.

EXAMPLE XXXVI

A suspension of 1 g. of platinum dioxide in 50 ml. of methanol is saturated with hydrogen. To it is added a solution of 15 g. of 9-nitro-6-methylene-5-oxytetracycline in 200 ml. of methanol and 1 ml. of concentrated hydrochloric acid. The suspension is hydrogenated under atmospheric conditions until 3 mols of hydrogen have been consumed. Removal of the catalyst by filtration and evaporation of the filtrate yields a residue of 9-amino-6-methylene-5-oxytetracycline.

EXAMPLE XXXVII

To separate solutions of 500 mg. 11a-chloro-6-deoxy-6 demethyl-6-methylenetetracycline hydrochloride and the corresponding 11a-fluoro compound in 25 ml. of methanol, is added 500 mg. of 5% palladium on carbon. Each suspension is then hydrogenated at atmospheric pressure until one mole of hydrogen has been consumed. The catalyst is removed by filtration and the filtrate evaporated to dryness in vacuo. The compounds separated are respectively 6-deoxy-6-demethyl-6-methylenetetracycline and a mixture of 11a-fluoro-6-deoxytetracycline and 11a-fluoro-6-epi-6-deoxytetracycline.

EXAMPLE XXXVIII

To 50 mg. of the mixed 11a-fluoro-6-deoxytetracycline and 11a-fluoro-6-epi-6-deoxytetracycline product of Example XXXVII dissolved in 1.25 ml. of 1% aqueous HCl, is added 30 mg. zinc dust and the mixture is stirred 15 minutes at 20° C. The zinc is removed by filtration and the product extracted with butanol from the mother liquor. On evaporation to dryness, a mixture of 6-deoxytetracycline and 6-epi-6-deoxytetracycline is obtained.

EXAMPLE XXXIX

*Acid addition salts of 6-epi-6-deoxy-5-oxytetracycline*

6-epi-6-deoxy-5-oxytetracycline is dissolved in methanol containing an equimolar amount of hydrogen chloride. The hydrochloride salt is then precipitated by the addition of ether, and is collected by filtration and dried. Butanol is employed to recrystallize the hydrochloride.

In the similar manner, acid addition salts of 6-epi-6-deoxy-5-oxytetracycline are prepared using, in lieu of hydrochloric acid, sulfuric, nitric, perchloric, hydrobromic, phosphoric, hydrofluoric, p-toluenesulfonic, hydriodic, tartaric, acetic, citric, malic, benzoic, glycollic, gluconic, gulonic, succinic, and sulfosalicyclic acids.

In like manner, the acid addition salts of the products of the examples appearing hereinafter are prepared. Those acid addition salts which are pharmaceutically unacceptable may be employed in conventional fashion for purification purposes to produce either the amphoteric compounds or pharmaceutically acceptable acid addition salts thereof. Additionally, the pharmaceutically unacceptable acid addition salts are useful as intermediates for producing other products of the present invention as will be apparent on considering the examples presented hereinafter.

EXAMPLE XL

*Metal salts of 6-epi-6-deoxy-5-oxytetracycline*

The sodium salt of 6-epi-6-deoxy-5-oxytetracycline is prepared by dissolving the amphoteric compound in methanol containing an equimolar of sodium hydroxide and evaporating the resulting mixture in vacuo. In this fashion, other metal salts are prepared including potassium, calcium, barium, lithium and strontium salts.

Metal salt complexes of 6-epi-6-deoxy-5-oxytetracycline are prepared by dissolving it in a lower aliphatic alcohol, preferably methanol, and treating with an equimolar amount of the selected metal salt, preferably dissolved in the selected alcohol. The insoluble metal salt complexes may be isolated by simple filtration. Generally, however, most of them are alcohol soluble and recovery is effected by evaporation of the solvent or addition of a non-solvent such as diethyl ether.

In this fashion, metal salt complexes of 6-epi-6-deoxy-5-oxytetracycline consisting primarily of compounds containing 1:1 ratio of metal to 6-epi-6-deoxy-5-oxytetracycline are prepared employing the following metal salts: calcium chloride, cobalt chloride, magnesium sulfate, magnesium chloride, stannous chloride, zinc chloride, cadmium chloride, barium chloride, silver nitrate, stannous nitrate, strontium nitrate, magnesium acetate, manganous acetate, palladium chloride, manganous chloride, cerium chloride, titanium chloride, platinum chloride, vanadium chloride, plumbous acetate, stannous bromide, zinc sulfate, chromous chloride and nickelous chloride.

In the same fashion, the same metal salt complexes of the compounds of the examples appearing hereinafter are prepared.

EXAMPLE XLI

*6-epi-6-deoxy-11a-chloro-5-oxytetracycline*

To a cold, stirred, solution of 1 g. 6-epi-6-deoxy-5-oxytetracycline in 15 ml. of dimethoxyethane there is added 0.35 g. of N-chlorosuccinimide. After 20 minutes at 0–5° C. the product is precipitated with ether and collected by filtration with ether wash.

EXAMPLE XLII

*6-epi-6-deoxy-11a-fluoro-5-oxytetracycline*

A suspension of 4.8 g. of 6-epi-6-deoxy-5-oxytetracycline hydrochloride in 100 ml. of methanol is cooled at 0° C. and nitrogen gas is bubbled through. A solution of 20 ml. of a normal solution of sodium methoxide in methanol is added and the mixture is saturated with perchloryl fluoride. The mixture is then maintained in a refrigerator for 24 hours during which time crystals of the chlorate salt of the desired product form. The filtrate yields a second crop of crystals of less pure product.

EXAMPLE XLIII

*6-epi-6-deoxy-7,11a-dichloro-5-oxytetracycline*

To 5 g. of 6-epi-6-deoxy-11a-chloro-5-oxytetracycline hydrochloride in 15 ml. of liquid hydrogen fluoride cooled at ice bath temperature, is added 1.5 g. of N-chlorosuccinimide. The solution is stirred at ice bath temperature for 1.5 hours. The crude product is precipitated by the addition of 500 ml. of ether and recovered by filtration.

EXAMPLE XLIV

*6-epi-6-deoxy-7-chloro-11a-fluoro-5-oxytetracycline*

To 4.6 g. of 6-epi-6-deoxy-11a-fluoro-5-oxytetracycline in 20 ml. of trifluoroacetic acid, there is added 1.4 g. of N-chlorosuccinamide and the mixture is allowed to stand at room temperature for 4 hours. After cooling, the mixture is added dropwise to stirred ether at 0° C., the product separates and is filtered and slurried several times with ether.

EXAMPLE XLV

*6-epi-6-deoxy-7-chloro-5-oxytetracycline*

(1) The product of Example XLIII (1 g.) is added to 50 ml. of methanol containing 100 mg. of 5% rhodium on carbon. The mixture is treated at a pressure of 3 atmospheres hydrogen gas at a temperature of 32° C. Hydrogenation is stopped after the uptake of hydrogen ceases, the mixture is filtered and the resulting solution is evaporated to dryness at reduced pressure. The residue is slurried in 25 ml. of ether, filtered and dried to obtain the desired product.

(2) Equivalent amounts of 6-epi-6-deoxy-7,11a-dichloro-5-oxytetracycline, sodium iodide and powdered zinc metal are refluxed in acetone for 30 minutes. The reaction mixture is cooled, filtered and concentrated under reduced pressure to obtain the desired product.

(3) To a solution of 0.45 g. of 6-epi-6-deoxy-7,11a-dichloro-5-oxytetracycline perchlorate in 7.5 ml. of water is added 0.45 g. of sodium hydrosulfite and the resulting mixture is stirred for 12 minutes. The product separates and is collected by filtration.

EXAMPLE XLVI

*6-epi-6-deoxy-7-phenylazo-11a-chloro-5-oxytetracycline*

One molecular proportion of aniline is dissolved in 2 N HCl, employing about 20 ml. thereof per gram of aniline, and the solution treated with 1 molecular proportion of sodium nitrite at a temperature of 0° C. The resulting benzene diazonium chloride solution is mixed at 0 to 20° C. with an aqueous solution of 1 molecular proportion of 6-epi-6-deoxy-11a-chloro-5-oxytetracycline and an equivalent quantity of sodium hydroxide, and containing sufficient sodium carbonate to neutralize the excess HCl in the diazotized aniline solution. The pH of the resulting solution is in the range 8–10. Stirring is continued at 0° C. for approximately 2 hours during which time crude 6-epi-6-deoxy-7-phenylazo-11a-chloro-5 - oxytetracycline separates. This product is collected on a filter, washed and dried.

EXAMPLE XLVII

*6-epi-6-deoxy-7-amino-5-oxytetracycline*

One part by weight of 6-epi-6-deoxy-7-phenylazo-11a-chloro-5-oxytetracycline is mixed with 20 parts by weight of methanol and ⅕ part by weight of 5% palladium on carbon hydrogenation catalyst is added to the mixture. The mixture is then hydrogenated at 30–45 p.s.i. in a conventional apparatus at 30° C. until consumption of hydrogen ceases. The catalyst is then filtered and the filtrate evaporated to dryness. The residue comprises a mixture of aniline and 6-epi-6-deoxy-7-amino-5-oxytetracycline. The aniline is removed from the residue by washing with ether.

EXAMPLE XAVIII

*6-epi-6-deoxy-7-nitro-5-oxytetracycline*

6-epi-6-deoxy-7-amino-5-oxytetracycline, 4.58 g., is dissolved in 20 ml. of 6 N nitric acid at 0° C. treated with 0.7 g. of sodium nitrite. The diazonium nitrate solution is then mixed with a suspension of cuprous oxide in water, which is prepared by reducing an aqueous solution of copper sulfate (approximately 5 g. in 50 ml. of water) with an alkaline glucose solution which is subsequently neutralized with acetic acid. A reaction ensues with the evolution of nitrogen. The mixture is strongly acidified to decompose the copper complexes and the 6-epi-6-deoxy-7-nitro-5-oxytetracycline is extracted from the solution with methyl isobutylketone.

21

This compound can also be prepared together with 6-epi-6-deoxy-9-nitro-5-oxytetracycline by direct nitration of 6-epi-6-deoxy-5-oxytetracycline. Thus, 0.96 g. of 6-epi-6-deoxy-5-oxytetracycline hydrochloride is dissolved in approximately 10 ml. of concentrated sulfuric acid at 0–5° C. and treated with 1.4 ml. of a 10:1 concentrated sulfuric acid —70% nitric acid solution in dropwise fashion with stirring at the same temperature during a 15 minute period. The solution is then poured into 400 ml. of anhydrous ether and the nitro-6-epi-6-deoxy-5-oxytetracyclines precipitate as the acid sulfate salts. The precipitate is cooled, washed and dried. This crude nitration product is crystallized from about 5 ml. of methanol to yield a mixture of 7-nitro- and 9-nitro-6-epi-6-deoxy-5-oxytetracyclines. The mixture is then separated by column partition chromatography using the toluenepyridine-water system. Since the 7-nitro product is the less polar component, it is the first to be eluted.

The diazonium replacement method has the advantage of producing the 7-nitro isomer and thus obviates the described separation process.

EXAMPLE XLIX

*6-epi-6-deoxy-7-acetylamino-5-oxytetracycline*

To a solution of 4.58 g. of 6-epi-6-deoxy-7-amino-5-oxytetracycline in 200 ml. of tetrahydrofurane and 200 ml. of dry methanol is added 20 ml. of acetic anhydride and the mixture is stirred for 45 minutes at room temperature. The mixture is then stripped of most of the solvent and dropped into dry ether, filtered and the solid cake reslurried in ether, filtered and dried to obtain crude product. The crude product is chromatographed on a cellulose column to obtain purified product as the main fraction.

Employing the procedure of this example, the following products are prepared:

6-epi-6-deoxy-7-formylamino-5-oxytetracycline
6-epi-6-deoxy-7-butrylamino-5-oxytetracycline
6-epi-6-deoxy-7-propionylamino-5-oxytetracycline
6-epi-6-deoxy-7-valerylamino-5-oxytetracycline

EXAMPLE L

*6-epi-6-deoxy-9-nitro-5-oxytetracycline*

To a mixture of 450 mg. of 6-epi-6-deoxy-5-oxytetracycline in 5.0 ml. of anhydrous liquid hydrogen fluoride is added 100 mg. of potassium nitrate. The mixture is stirred at 15° C. for 30 minutes and then evaporated to dryness. The residue is slurried in ether and filtered to obtain the crude product which is slurried in 5% aqueous HCl and extracted with butanol. The butanol extract is concentrated to obtain the product which is recrystallized from water with hydrochloric acid.

EXAMPLE LI

*6-epi-6-deoxy-9-amino-5-oxytetracycline*

To a solution of 2.5 g. of 6-epi-6-deoxy-9-nitro-5-oxytetracycline dissolved in 50 ml. of water and 2 ml. of concentrated HCl is added 1.3 g. of zinc dust with stirring at 20° C. After 15 minutes the mixture is filtered, the pH is adjusted to 2.5 and the mixture is extracted with butanol. The butanol extract on concentration gives the desired product as the dihydrochloride.

EXAMPLE LII

*6-epi-6-deoxy-9-formylamino-5-oxytetracycline*

To a solution of 7.0 g. of 6-epi-6-deoxy-9-amino-5-oxytetracycline in 40 ml. of dry pyridine is added 20 ml. of acetoformic acid at ice bath temperature. The mixture is stirred for 15 minutes at this temperature and added dropwise to 1 liter of dry ether. The product is filtered, reslurried in ether and filtered again. The crude product is suspended in 100 ml. of water providing a solution of pH of 4.2 and stirred for 10 minutes to hydrolyze O-formyl groups. The pH mixture is then adjusted to pH 5.5 and the solution is freeze-dried to obtain crude product which is chromatographed on a cellulose column to obtain purified product as the main fraction.

Employing the procedure of this example, the following products are prepared:

6-epi-6-deoxy-9-acetylamino-5-oxytetracycline
6-epi-6-deoxy-9-butrylamino-5-oxytetracycline
6-epi-6-deoxy-9-propionylamino-5-oxytetracycline
6-epi-6-deoxy-9-valerylamino-5-oxytetracycline

EXAMPLE LIII

*6-epi-6-deoxy-9-chloro-5-oxytetracycline*

To 1.04 gram of 6-epi-6-deoxy-9-amino-5-oxytetracycline hydrochloride dissolved in 5 ml. water and 2 ml. concentrated hydrochloric acid cooled in an ice bath is added below the surface of the liquid 150 mg. sodium nitrite in 2 ml. water. After stirring 20 minutes, 50 mg. urea is added to destroy the excess nitrous acid. Cuprous chloride/hydrogen chloride is added and the mixture stirred at room temperature for five minutes. It is then immersed in a 50° C. water bath for 20 minutes, then cooled and extracted with n-butanol. The extract is dried with sodium sulfate and evaporated to dryness.

The cuprous chloride is prepared by adding a hot solution of 600 mg. copper sulfate pentahydrate, and 160 mg. sodium chloride in 2 ml. water to 160 mg. sodium bisulfite in 1.7 ml. of 1.1 N sodium hydroxide. The mixture is cooled, centrifuged and the solid washed with 1 ml. water. It is then dissolved in 1 ml. concentrated HCl and used above.

The crystalline p-toluenesulfonate is prepared by standard procedure.

EXAMPLE LIV

*7-chloro-9-nitro-6-epi-6-deoxy-5-oxytetracycline*

To a solution of 1.0 g. of 7-chloro-6-epi-6-deoxy-5-oxytetracycline base in 8 ml. of anhydrous liquid hydrogen fluoride at 0° C. is added 220 mg. of $KNO_3$. The mixture is stirred for 30 minutes at 0° C. and the hydrogen fluoride is evaporated off under nitrogen. The residue is slurried in dry ether, filtered and dried to obtain the desired product.

EXAMPLE LV

*9-nitro-7,11a-dichloro-6-epi-6-deoxy-5-oxytetracycline*

To a solution of 600 mg. 7,11a-dichloro-6-epi-6-deoxy-5-oxytetracycline perchlorate in 1.5 ml. of anhydrous liquid hydrogen fluoride is added 100 mg. $KNO_3$. The mixture is stirred at 15° C. for 30 minutes and then evaporated to dryness. The residue is slurried in ether and filtered to obtain the crude product which is slurried in 5% aqueous HCl and extracted with butanol. The butanol extract is concentrated to obtain the product which is recrystallized from water with hydrochloric acid.

EXAMPLE LVI

*9-nitro-11a-chloro-6-epi-6-deoxy-5-oxytetracycline*

A solution of 5 g. of 11a-chloro-6-epi-6-deoxy-5-oxytetracycline in 10 ml. of anhydrous hydrogen fluoride is allowed to stand for 3½ hours after which 1.2 g. of $KNO_3$ is added with stirring. Stirring is continued for 1 hour at ice bath temperature and the mixture is then added to 200 ml. of dry ether, filtered and washed with ether to obtain crude product.

EXAMPLE LVII

*7-chloro-9-amino-6-epi-6-deoxy-5-oxytetracycline*

To a solution of 1.42 g. of 7-chloro-9-nitro-6-epi-6-deoxy-5-oxytetracycline dissolved in 50 ml. of water and 2 ml. of concentrated HCl is added 1.3 g. of zinc dust with stirring at 20° C. After 15 minutes, the mixture is filtered, the pH adjusted to 2.5 and the mixture is extracted 5 times with 30 milliliters per extraction of butanol. The butanol extract on concentration gives the desired product as the dihydrochloride.

This same product is also obtained by reduction with aqueous sodium hydrosulfite of 9-nitro-7,11a-dichloro-6-epi-6-deoxy-5-oxytetracycline.

EXAMPLE LVIII

*7,11a-dichloro-9-nitro-6-epi-6-deoxy-5-oxytetracycline*

One gram of 7,11a-dichloro-6-epi-6-deoxy-5-oxytetracycline hydrochloride is dissolved in 20 ml. of acetic acid and 1 ml. of concentrated $HNO_3$ is added. The mixture is allowed to stand for 12 hours and then concentrated to ¼ of its original volume. It is added dropwise to 200 ml. of ether with stirring at ice bath temperature. Stirring is continued for 3 hours and the solid is then recovered by filtration. The solid is slurried several times in ether and then dried to obtain the product as the hydrochloride salt.

Using the same procedure, the following products are obtained from corresponding starting compounds:

7-chloro-11a-fluoro-9-nitro-6-epi-6-deoxy-5-oxytetracycline 7-bromo-11a-chloro-9-nitro-6-epi-6-deoxy-5-oxytetracycline 7-iodo-11a-fluoro-9-nitro-6-epi-6-deoxy-5-oxytetracycline These products are converted respectively to the 7-chloro-, 7-bromo-, and 7-iodo-9-amino-6-epi-6-deoxy-5-oxytetracyclines by the reduction procedures of the previous examples.

EXAMPLE LIX

*9-formylamino-7-chloro-6-epi-6-deoxy-5-oxytetracycline*

To a solution of 4.5 g. of 9-amino-7-chloro-6-epi-6-deoxy-5-oxyteteracycline base in 40 ml. of dry pyridine is added 20 ml. of acetoformic acid at ice bath temperature. The mixture is stirred for 15 minutes at that temperature and added dropwise to 1 liter of dry ether. The product is filtered, reslurried in ether and slurried again. The crude product is then suspended in 100 ml. of water providing a solution of pH 4.2 and stirred for 10 minutes to hydrolyze O-formyl groups. The pH of the mixture is then adjusted to pH 5.5 and the solution freeze-dried to get crude product which is chromatographed on a cellulose column to obtain purified product as the main fraction.

EXAMPLE LX

*9-acetylamino-7-chloro-6-epi-6-deoxy-5-oxytetracycline*

To a solution of 4.2 g. of 7-chloro-9-amino-6-epi-6-deoxy-5-oxytetracycline base in 200 ml. of dry tetrahydrofurane and 200 ml. of dry methanol is added 20 ml. of acetic anhydride and the mixture is stirred for 45 minutes at room temperature. The mixture is then stripped of most of the solvent and introduced into dry ether, filtered and the solid cake reslurried in ether, filtered and dried to obtain crude product. The crude product is chromatographed as in Example LIX to obtain purified product as the main fraction.

Employing the procedures of Example LIX and the present example, the following products are prepared:

9-butyrylamino-7-chloro-6-epi-6-deoxy-5-oxytetracycline 9-propionylamino-7-chloro-6-epi-6-deoxy-5-oxytetracycline 9-valerylamino-7-chloro-6-epi-6-deoxy-5-oxytetracycline

EXAMPLE LXI

A suspension of 6-epi-6-deoxy-5-oxytetracycline is prepared with the following compositions:

| | | |
|---|---|---:|
| Antibiotic | g | 31.42 |
| 70% aqueous sorbitol | g | 714.29 |
| Glycerine, U.S.P. | g | 185.35 |
| Gum acacia (10% solution) | ml | 100 |
| Polyvinyl pyrrolidone | g | 0.5 |
| Butyl parahydroxybenzoate (preservative) | g | 0.172 |
| Propyl parahydroxybenzoate (preservative) | g | 0.094 |
| Water, distilled to make 1 liter. | | |

To this suspension, various sweetening and flavoring agents, as well as acceptable colors, may be added by choice. The suspension contains approximately 25 mg. of antibiotic activity per milliliter.

EXAMPLE LXII

A solution of 6-epi-6-deoxy-5-oxytetracycline is prepared with the following compositions:

| | | |
|---|---|---:|
| Antibiotic | g | 30.22 |
| Magnesium chloride hexahydrate | g | 12.36 |
| Monoethanolamine | ml | 8.85 |
| Propylene glycol | g | 376 |
| Water | ml | 94 |

The solution has a concentration of 50 mg./ml. and is suitable for parenteral and especially for intramuscular administration.

EXAMPLE LXIII

A tablet base is prepared by blending the following ingredients in the proportion by weight indicated:

| | |
|---|---:|
| Sucrose, U.S.P. | 80.3 |
| Tapioca starch | 13.2 |
| Magnesium stearate | 6.5 |

Into this base there is blended sufficient 6-epi-6-dioxy-5-oxy-tetracycline to provide tablets containing 25, 100 and 250 mg. of active ingredients.

EXAMPLE LXIV

A blend is prepared containing the following ingredients:

| | |
|---|---:|
| Calcium carbonate, U.S.P. | 17.6 |
| Dicalcium phosphate | 18.8 |
| Magnesium trisilicate, U.S.P. | 5.2 |
| Lactone, U.S.P. | 5.2 |
| Potato starch | 5.2 |
| Magnesium stearate A | 0.8 |
| Magnesium stearate B | 00.35 |

To this blend is added sufficient 6-epi-6-deoxy-5-oxytetracycline to provide capsules containing 25, 100 and 250 mg. of active ingredients.

EXAMPLE LXV

One thousand grams of 6-epi-6-deoxy-5-oxytetracycline are intimately mixed and ground with 2500 grams of sodium ascorbate. The ground, dry mixture is filled into vials, sterilized with ethylene oxide and the vials sterilely stoppered. For intravenous administration sufficient water is added to the vials to form a solution containing 10 mg. of active ingredient per milliliter.

What is claimed is:

1. The process which comprises introducing hydrogen into a reaction inert solvent medium containing a catalytic amount of a noble metal catalyst and a tetracycline compound selected from the group consisting of

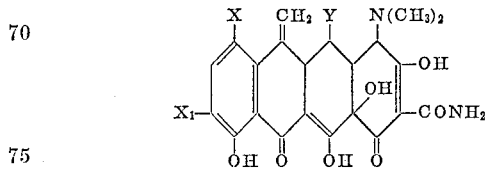

and acid addition salts thereof and polyvalent metal salt complexes thereof wherein:

Y is selected from the group consisting of hydrogen and hydroxyl;
X is selected from the group consisting of hydrogen, chloro, iodo and bromo;
$X_1$ is selected from the group consisting of hydrogen, amino and lower alkanoylamino;
$X_2$ is selected from the group consisting of hydrogen and nitro; and
Z is selected from the group consisting of chloro and fluoro;

and maintaining hydrogen in contact with said reaction mixture at a temperature of from about 0–60° and at a pressure of from about atmospheric to 2,000 p.s.i. until reaction of from one mol to 6 mols of hydrogen per mol of said tetracycline compound occurs.

2. The process of claim 1 wherein the noble metal catalyst is rhodium.
3. The process of claim 1 wherein the noble metal catalyst is palladium.
4. The process of claim 1 wherein resulting 6-deoxy- and α-6-deoxytetracycline compounds are separately recovered.
5. The process of producing a mixture of 6-deoxy-5-oxytetracycline and α-6-deoxy-5-oxytetracycline which comprises the step of containing 6-deoxy-6-demethyl-6-methylene-5-oxytetracycline in a reaction inert solvent medium and in the presence of a catalytic amount of a noble metal catalyst with hydrogen at a temperature of from 0–60° C. and at a hydrogen pressure of from atmospheric to 2,000 p.s.i.
6. The process of claim 5 wherein the noble metal catalyst is rhodium.
7. The process of claim 5 wherein the noble metal catalyst is palladium.
8. The process of claim 5 wherein resulting mixture of compounds is separated to obtain relatively pure α-6-deoxy-5-oxytetracycline.
9. A compound selected from the group consisting of α-6-deoxy-5-oxytetracycline, α-6-deoxy-7-substituted-5-oxytetracycline, α-6-deoxy-9-substituted-5-oxytetracycline, α-6-deoxy-11a-chloro-5-oxytetracycline, α-6-deoxy-11a-fluoro-5-oxytetracycline, α-6-deoxy-7,11a-dichloro-5-oxytetracycline, α-6-deoxy-7-chloro-11a-fluoro-5-oxytetracycline, the corresponding 5-desoxy compounds, the acid addition salts thereof, and the pharmaceutically acceptable metal salts thereof, each substituent of said 7 and 9 substituted compounds being selected from the group consisting of chloro, nitro, amino and lower alkanolylamino.

10. α-6-deoxy-5-oxytetracycline.
11. α-6-deoxy-7-chloro-5-oxytetracycline.
12. α-6-deoxy-11a-fluoro-5-oxytetracycline.
13. α-6-deoxy-9-nitro-5-oxytetracycline.
14. α-6-deoxy-9-amino-5-oxytetracycline.
15. α-6-deoxy-9-acetylamino-5-oxytetracycline.
16. α-6-deoxy-7-chloro-11a-fluoro-5-oxytetracycline.
17. α-6-deoxytetracycline.
18. α-6-deoxy-7-chlorotetracycline.
19. α-6-deoxy-11a-chlorotetracycline.
20. α-6-deoxy-9-aminotetracycline.
21. The process of claim 1 wherein the noble metal is platinum.

References Cited by the Examiner

UNITED STATES PATENTS

| | | | |
|---|---|---|---|
| 2,878,289 | 3/59 | McCormick et al. | 260—559 |
| 2,976,318 | 3/61 | Blackwood | 260—559 |
| 3,005,023 | 10/61 | Miller | 260—559 |
| 3,019,260 | 1/62 | McCormick et al. | 260—559 |
| 3,036,129 | 5/62 | Hlavka et al. | 260—559 |

FOREIGN PATENTS

| | | |
|---|---|---|
| 565,025 | 8/58 | Belgium. |
| 566,456 | 10/58 | Belgium. |
| 572,584 | 4/59 | Belgium. |
| 5,618 | 8/60 | Peru. |

OTHER REFERENCES

Boothe et al.: "Journ. Am. Chem. Soc.," volume 82, pages 1253–4 (1960).

Stephens et al.: "Journ. Am. Chem. Soc.," volume 80, pages 5324–25 (1958).

McCormick et al.: "Journ. Am. Chem. Soc.," volume 79, pages 2849–50 (1957).

NICHOLAS S. RIZZO, *Primary Examiner.*

IRVING MARCUS, *Examiner.*